Sept. 8, 1942.   C. R. HOLMSTROM   2,295,213
DUAL-DRIVE TANDEM REAR-AXLE VEHICLE
Filed May 31, 1941   2 Sheets-Sheet 1

INVENTOR.
Carl R Holmstrom
BY
ATTORNEY.

Sept. 8, 1942. C. R. HOLMSTROM 2,295,213
DUAL-DRIVE TANDEM REAR-AXLE VEHICLE
Filed May 31, 1941 2 Sheets-Sheet 2
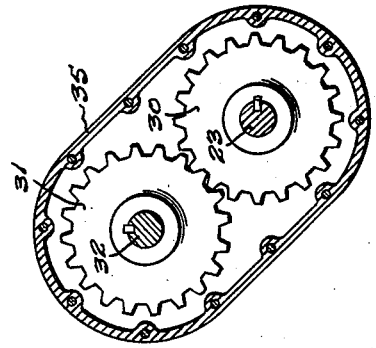
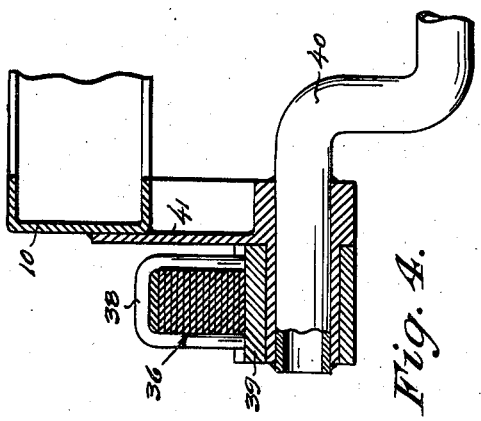
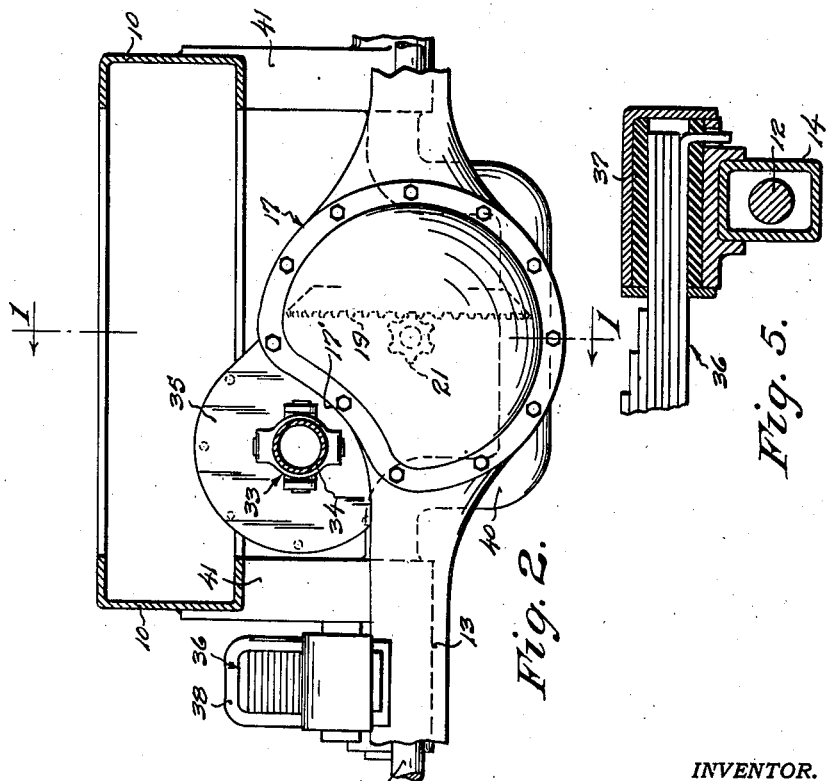
INVENTOR.
Carl R. Holmstrom
BY
ATTORNEY.

Patented Sept. 8, 1942

2,295,213

UNITED STATES PATENT OFFICE 2,295,213

DUAL-DRIVE TANDEM REAR-AXLE VEHICLE

Carl R. Holmstrom, Seattle, Wash., assignor to Kenworth Motor Truck Corporation, Seattle, Wash., a corporation of Washington Application May 31, 1941, Serial No. 396,125

4 Claims. (Cl. 180—22)

This invention relates to tandem rear-axle vehicles in which both axles are driven, which is to say a vehicle of the type customarily referred to as a "dual-drive bogey."

The object of the invention is to perfect a vehicle of the described character through the instrumentality, firstly, of providing a between-axle propeller coupling extending from one to the other of the tandem rear axles including in-line pinion shafts disposed to lie on the approximate horizontal plane of the axles and having direct driving connection with the differentials of the latter, and wherein the drive from the main propeller shaft of the vehicle is carried over the top of the forwardly disposed tandem rear axle and downwardly between the axles to one of the said pinion shafts through a set of drop-gears or the equivalent in change-level transfer mechanism, the gearing being axially anchored in relation to the housing of the differential which corresponds to the pinion being driven, and secondly, suspending the axles in such a bogey hook-up as will function to hold the pinion shafts fairly well in line while permitting a vertical movement of the same out of parallelism with the plane of the frame. Distinguished from this suspension hook-up is the one most generally used in dual-drive bogeys, namely a system characterized in that the pinion shafts, by an axial anchoring of the same in relation to the axle housings, would be held against movement out of parallelism with the frame and as a result would move upwardly and downwardly, alternately, in paralleling planes which cross one another, the consequence of such a suspension as latterly described, where applied to my drive system in a close-coupled bogey, being that excessive propeller shaft angles are set up and which are substantially eliminated where the bogey maintains the in-line relation of the pinion shafts under driving conditions. I make no claim to the illustrated bogey suspension other than as the same or its functional equivalent makes practical the application of my drive assembly to a dual-drive bogey in which the two tandem axles lie in the usual close-coupled relation, but it is believed clear that my driving arrangement may be applied, and I accordingly do not disclaim its use, in the engineering of a dual drive to two axles, howsoever suspended, disposed in sufficiently distal relation that otherwise excessive propeller shaft deflection is brought within working limits.

The invention consists in the novel construction and in the adaptation and combination of parts hereinafter described and claimed.

In the drawings:

Fig. 2 is a transverse vertical section thereof looking rearwardly on line 2—2 of Fig. 1.

Fig. 3 is a detail transverse vertical section on line 3—3 of Fig. 1.

Fig. 4 is a fragmentary transverse vertical section taken between the tandem rear axles to detail the pivotal support for the bogey suspension; and Fig. 5 is a fragmentary longitudinal vertical section detailing one of the two terminal connections used between the ends of the bogey springs and the axle housings.

Figure 1:
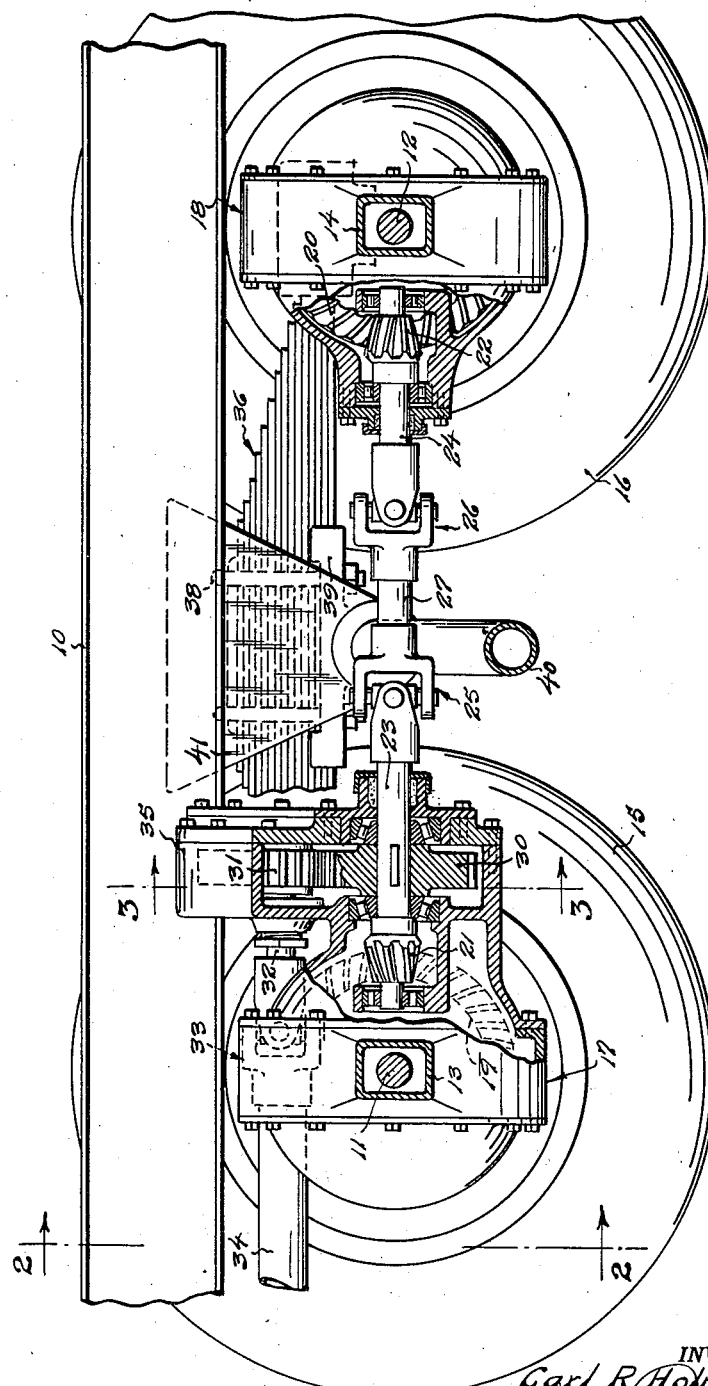
Figure 1 is a fragmentary longitudinal vertical section representing a preferred embodiment of the present invention and taken on line 1—1 of Fig. 2.

Referring to the drawings, the numeral 10 represents the main frame channels of a dual-drive tandem rear-axle vehicle, from which is carried the tandem axle assemblies comprised of live axles 11 and 12 housed in members 13 and 14 and operating, respectively, to drive the forwardly and rearwardly disposed tandem rear wheels 15 and 16, the said axle housings being continuous with centrally located housings 17 and 18 for differential gearing which includes ring gears 19 and 20.

The drive which I employ provides, for the ring gears, single reduction spiral bevel gears 21 and 22 carried on the outer ends of respective pinion shafts 23 and 24, the shafts being applied to occupy in-line positions on the approximate horizontal plane of the axles or, otherwise stated, the shafts point toward one another and locate the gears 21 and 22 to the rear and to the front, respectively, of the forwardly and rearwardly disposed axles 11 and 12. While necessarily having their inner ends in close proximity due to the length required for bearings, and assuming a reasonable center-to-center distance between the axles, the spacing between the pinion shafts is sufficient to accommodate universals 25 and 26 with a very short between-axle propeller coupling 27.

I indicate at 30 and 31 a pair of drop transfer gears to the forwardly disposed pinion shaft 23, the former of these gears being keyed to the pinion shaft and the latter being carried upon a stub shaft 32 which is given a universal connection, as at 33, with the main propeller shaft 34 leading from the transmission of the vehicle. Housing the drop gears is a gear case 35, which I form either integral with or bolted to the differential housing 17 in a manner to have the axis of the upper gear located above the axle housing 13 and in laterally offset relation from the vertical center line of the differential to the side opposite the ring gear 19. It will be seen that I illustrate a special banjo section having a notch, as at 17', in the upper outline of the differential housing, the purpose thereof being self-evident, namely to reduce the required center-to-center distance from the power-intake to the power-outgo shafts of the drop-gear arrangement and in consequence permit the use of the described two-gear as distinguished from a three-gear, or a chain drive, assembly. Either of the latter could, of course, be satisfactorily used. It is believed to be equally obvious, as a slight departure from the illustrated expedient of notching the differential housing to clear the swing diameter of the universal joint, that the top shaft of the drop gearing might be projected through and find a bearing in a specially designed differential housing, the differential in such case retaining the standard outline and the universal being applied forwardly thereof on the protruding forward end of the shaft.

Believed to be apparent from an inspection of the described parts is the fact that the power from the transmission which is brought down between the axles to the front pinion shaft comes off the front end of said shaft to the forward axle and off the rear end to the rear axle. This is an especially favorable hook-up from the torque standpoint by contrast with those types of tandem-axle drives in which all of the torque for both rear axles is carried through the forward pinion gear.

It is considered apparent that my described drive permits, where desired, the application of a differential between the front and the rear pinion shafts, but an outstanding advantage of my drive method is that a differential action between these shafts can be much better dispensed with than in other drive methods from the fact that any fight occurring between the two tandem rear axles caused by unequal tire-rolling radii is confined entirely to the axles and to the between-axle propeller shaft or shafting with no additional tooth stress being carried to the gear train.

Describing now the bogey suspension for which, as before stated, I make no claim separately and apart from the advanced drive, the salient feature is the employment of a centrally pivoted suspension beam, as 36, having its axle-connecting ends embedded in elastic rubber blocks 37. Said beam, comprised of a multiplicity of spring leaves strapped by U-bolts 38 to a saddle hanger 39, pivots on the cross-tube 40 which, at opposite sides of the vehicle, is given a rigid mounting in a bracket 41 which is in turn welded or otherwise permanently fixed to the frame channels 10. While other forms of bracing might be employed, the cross-tube is readily applied by bending the same in the manner illustrated to clear the between-axle propeller shaft 27.

The invention should be clear from the foregoing description taken in connection with the illustration of the now preferred embodiment, in connection with which it may be stated that little provision need be made for spring deflection in the bogey due to the evening effect of the axle oscillation. However, the two pinion shafts will assume a slight upward slant when the vehicle is empty and in consequence cause some universal joint angularity. Conversely, when the vehicle is heavily loaded a slight universal joint angle is created from a slant of the pinion shafts in the opposite direction. In either case, however, the angularity is such that no distortional strains upon the universal joints are present.

It is not my intention to imply any limitations other than as the same are necessarily brought into the hereto annexed claims to distinguish from prior knowledge in the art.

What I claim is:

1. In a dual-drive close-coupled tandem rear-axle vehicle, in combination with the live tandem rear axles, differentials therefor, housings for said axles and differentials, a propeller shaft for driving said axles, and a vehicle main frame: a pair of suspension beams, one at each side of the frame, extending longitudinally thereof from one to the other axle with the ends flexibly connected to the ends of the axle housings and with the centers pivotally supported from the frame, said flexible connection comprising blocks of elastic rubber carried by the axle housings and into which said beam ends are embedded and functioning to restrain the axle housings against relative rotation; in-line pinion shafts arranged to lie on the approximate horizontal plane of the axle and mounted to extend rearwardly from the forwardly disposed tandem rear axle and forwardly from the rearwardly disposed rear axle; a stubbed between-axle propeller shaft interposed between and connected by universals to the inner ends of said pinion shafts; driving connection from the outer ends of the pinion shafts to the differentials of the related axles; a stub drive shaft having universal connection with the main propeller shaft and disposed parallel with and elevated above the forwardly disposed pinion shaft sufficient to provide clearance between a forward prolongation of said stub drive shaft and the upper outline of the forward axle housing; a set of drop-gears disposed between the axles and having its upper gear driven by said stub drive shaft and the lower gear driving the forwardly disposed pinion shaft; and a gear case for said drop-gearing supported from the forwardly disposed axle housing.

2. A vehicle construction according to claim 1 having the universal connection from the main propeller shaft to the stub drive shaft disposed in the approximate vertical plane occupied by the forwardly disposed axle housing, and with the stub drive shaft being laterally offset from the longitudinal median line of the forwardly disposed differential in a position locating said universal in the crotch formed at the juncture of the axle and differential housings, sufficient clearance being provided relative to the outline of said crotch to accommodate the swing diameter of the universal.

3. In a dual-drive tandem rear-axle vehicle, in combination with the live tandem rear axles, differentials therefor, housings for said axles and differentials of which the differential housing projects above and describes a crotch at its point of juncture with the related axle housing, and a shaft for driving said axles; in-line pinion shafts disposed on the approximate longitudinal median line of the differentials, with one of said shafts having driving connection to and extending rearwardly from the forwardly disposed differential and the other shaft having driving connection to the rearwardly disposed differential and extending forwardly therefrom into spaced relation to said forward pinion shaft; a between-axle propeller shaft interposed between and connected by universals to the inner ends of the pinion shafts; a stub drive shaft having universal connection with the main propeller shaft and located parallel with the forwardly disposed pinion shaft in such elevated laterally off-set relation thereto as to dispose the axial line of said shaft within said crotch of the forwardly dissposed axle and differential housings; and driving connection to the rear of said forwardly disposed differential functioning to drop the drive from the stub shaft to the forwardly disposed pinion shaft.

4. In a dual-drive tandem rear-axle vehicle: the combination of the live tandem rear axles; differentials therefor providing ring gears for driving the axles disposed in laterally offset relation to the longitudinal median line of the related differential; in-line pinion shafts occupying the approximate longitudinal median line of the differentials and extending rearwardly from the forwardly disposed differential and forwardly from the rearwardly disposed differential, and at their outer ends having driving connection with the ring gears of the related differentials; a between-axle propeller shaft interposed between and connected by universals to the inner ends of the pinion shafts; housings for the forwardly disposed and for the rearwardly disposed tandem rear axles, and for the related differentials, said housing for the forwardly disposed differential, considered in end elevation, being characterized in that its upper outline at the side thereof opposite from the ring gear is marginally dished to form a reentrant opening the inner limits of which approach the axial line of the related pinion shaft to a degree exceeding that which occurs at the other or ring gear-housing side of the differential housing; a stub drive shaft having universal connection with the main propeller shaft of the vehicle and occupying said reentrant opening; and driving connection to the rear of said forwardly disposed differential functioning to carry the drive from the stub shaft to one of the in-line pinion shafts.

CARL R. HOLMSTROM.